United States Patent
Alasia et al.

(10) Patent No.: US 7,729,509 B2
(45) Date of Patent: Jun. 1, 2010

(54) ILLUMINATED LENS DEVICE FOR USE IN OBJECT AUTHENTICATION

(75) Inventors: Alfred V. Alasia, Wellington, FL (US); Alfred J. Alasia, Royal Palm Beach, FL (US); Thomas C. Alasia, Wellington, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 391 days.

(21) Appl. No.: 11/928,194

(22) Filed: Oct. 30, 2007

(65) Prior Publication Data

US 2008/0056532 A1 Mar. 6, 2008

Related U.S. Application Data

(63) Continuation-in-part of application No. 10/872,232, filed on Jun. 18, 2004, now Pat. No. 7,634,104.

(60) Provisional application No. 60/913,931, filed on Apr. 25, 2007.

(51) Int. Cl.
*G06K 9/00* (2006.01)
(52) U.S. Cl. .................. 382/100; 382/115; 382/232; 382/233
(58) Field of Classification Search .......... 382/100, 382/232, 233, 115; 359/665, 666; 340/5.6, 340/5.67; 380/54, 59; 283/89, 92; 235/382, 235/457, 454, 459
See application file for complete search history.

(56) References Cited

U.S. PATENT DOCUMENTS

| | | | |
|---|---|---|---|
| 3,524,395 A | 8/1970 | Alasia | |
| 3,635,778 A | 1/1972 | Rice et al. | |
| 3,642,346 A | 2/1972 | Dittmar | |
| 3,781,109 A | 12/1973 | Mayer et al. | |
| 3,784,289 A | 1/1974 | Wicker | |

(Continued)

FOREIGN PATENT DOCUMENTS

EP 0598357 B1 5/1994

(Continued)

OTHER PUBLICATIONS

"*IR Inks*", http://www.maxmax.com, pp. 1-2, printed Jun. 6, 2004.

(Continued)

*Primary Examiner*—Anh Hong Do
(74) *Attorney, Agent, or Firm*—Hunton & Williams LLP

(57) ABSTRACT

An illuminated lens device for use in viewing authentication images is disclosed. The device includes a housing having a housing interior. The housing has a proximal end with a proximal aperture and an opposing distal end with a distal aperture. The lens device further includes a lens disposed at least partially within the housing interior. The lens is configured and positioned so that at least a portion of an authentication image is viewable through the proximal aperture when the housing is placed with the distal aperture aligned with and adjacent the at least a portion of the authentication image. The lens device also includes at least one light source disposed within the housing interior. The at least one light source is configured to illuminate the authentication image with light in a predetermined frequency range when the housing is placed with the distal aperture adjacent the authentication image.

11 Claims, 9 Drawing Sheets

U.S. PATENT DOCUMENTS

| | | | |
|---|---|---|---|
| 3,937,565 A | 2/1976 | Alasia | |
| 4,092,654 A | 5/1978 | Alasia | |
| 4,147,295 A | 4/1979 | Nojiri et al. | |
| 4,150,781 A * | 4/1979 | Silverman et al. | 235/382 |
| 4,198,147 A | 4/1980 | Alasia | |
| 4,303,307 A | 12/1981 | Tureck et al. | |
| 4,715,623 A | 12/1987 | Roule et al. | |
| 4,914,700 A | 4/1990 | Alasia | |
| 5,027,401 A | 6/1991 | Soltesz | |
| 5,113,213 A | 5/1992 | Sandor et al. | |
| 5,178,418 A | 1/1993 | Merry et al. | |
| 5,195,122 A | 3/1993 | Fabian | |
| 5,195,435 A | 3/1993 | Morrone et al. | |
| 5,303,370 A | 4/1994 | Brosh et al. | |
| 5,396,559 A | 3/1995 | McGraw | |
| 5,438,429 A | 8/1995 | Haeberli et al. | |
| 5,576,527 A | 11/1996 | Sawanobori | |
| 5,708,717 A | 1/1998 | Alasia | |
| 5,735,547 A | 4/1998 | Morelle et al. | |
| 5,830,609 A | 11/1998 | Warner et al. | |
| 5,904,375 A | 5/1999 | Brugada | |
| 5,974,150 A | 10/1999 | Kaish et al. | |
| 6,084,713 A | 7/2000 | Rosenthal | |
| 6,104,812 A | 8/2000 | Koltai et al. | |
| 6,171,734 B1 | 1/2001 | Warner et al. | |
| 6,222,650 B1 | 4/2001 | Long | |
| 6,252,963 B1 | 6/2001 | Rhoads | |
| 6,256,150 B1 | 7/2001 | Rosenthal | |
| 6,260,763 B1 | 7/2001 | Svetal | |
| 6,280,891 B2 | 8/2001 | Daniel et al. | |
| 6,343,138 B1 | 1/2002 | Rhoads | |
| 6,385,352 B1 | 5/2002 | Roustaei | |
| 6,414,794 B1 | 7/2002 | Rosenthal | |
| 6,729,546 B2 | 5/2004 | Roustaei | |
| 6,744,909 B1 * | 6/2004 | Kostrzewski et al. | 382/115 |
| 6,817,525 B2 | 11/2004 | Piva et al. | |
| 7,317,814 B2 * | 1/2008 | Kostrzewski et al. | 382/115 |
| 2001/0005570 A1 | 6/2001 | Daniel et al. | |
| 2002/0008380 A1 | 1/2002 | Taylor et al. | |
| 2002/0185857 A1 | 12/2002 | Taylor et al. | |
| 2003/0012562 A1 | 1/2003 | Lawandy et al. | |
| 2003/0015866 A1 | 1/2003 | Cioffi et al. | |
| 2003/0137145 A1 | 7/2003 | Fell et al. | |

FOREIGN PATENT DOCUMENTS

| | | |
|---|---|---|
| EP | 1147912 A2 | 10/2001 |
| GB | 1407065 | 9/1975 |
| WO | 92/04692 | 3/1992 |
| WO | 93/15491 | 8/1993 |
| WO | 94/07326 | 3/1994 |
| WO | 98/15418 | 4/1998 |
| WO | 01/87632 A1 | 11/2001 |

OTHER PUBLICATIONS

"*UV Inks*"; http://www.maxmax.com, pp. 1-2, printed Jun. 6, 2004.
"*Security Supplies Tags*"; Zebra Technologies, http://www.zebra.com, pp. 1-2, printed Jun. 6, 2004.
"*IRUCG Dectector / 940 nm Light Source*"; http:// www.maxmax.com pp. 1-4, printed Sep. 15, 2004.

* cited by examiner

ILLUMINATED LENS DEVICE FOR USE IN
OBJECT AUTHENTICATION

This application is a continuation-in-part of U.S. patent application Ser. No. 10/872,232, filed Jun. 18, 2004, now U.S. Pat. No. 7,634,104 the disclosures of which is hereby incorporated by reference in its entirety. The application also claims the benefit of U.S. Provisional Application No. 60/913,931, filed Apr. 25, 2007, which is hereby incorporated by reference in its entirety.

BACKGROUND OF THE INVENTION

Various methods have been proposed for protecting goods and documents from counterfeit protection. Some such methods include creating images which may be embedded and/or concealed as encoded, hidden images. The images cannot easily be seen, if at all, without the use of a special device to decode, or reveal, an authentication image when placed over the location of the encoded image. When a decoder is placed over a branded good, for example, at a location where an authentic product is known to contain an encoded image, a party may be able to verify the good's authenticity by whether or not the authentication image is revealed when one views the location through the decoder.

In many cases, a party interested in investigating whether not a product or document is authentic may be conducting the investigation in a low light situation, such as a warehouse or shipyard where goods are often subject to inspection. Similarly, a police officer may want to determine the authenticity of a driver's license during a night time traffic stop along a dimly lit street. These low light situations can make authentication difficult.

SUMMARY OF THE INVENTION

The present invention provides systems and methods for an illuminated lens for use in object authentication. Aspects of the invention provide an illuminating lens device for viewing an authentication image. The lens device includes a housing having at least one wall defining a housing interior. The housing has a proximal end with a proximal aperture and an opposing distal end with a distal aperture. The lens device further includes a lens disposed a least partially within the housing interior. The lens is configured and positioned so that at least a portion of an authentication image is viewable through the proximal aperture when the housing is placed with the distal aperture aligned with and adjacent the at least a portion of the authentication image. The lens device also includes at least one light source disposed within the housing interior. The at least one light source is configured to illuminate the authentication image with light in a predetermined frequency range when the housing is placed with the distal aperture adjacent the authentication image.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which:

FIG. 2b is a cross-sectional view of the illuminated decoder of FIG. 2a.

FIG. 3b is a cross-sectional view of the illuminated decoder of FIG. 3a.

FIG. 4b is a cross-sectional view of the illuminated decoder of FIG. 4a.

FIG. 6b is a cross-sectional view of the illuminated decoder of FIG. 6a.

DETAILED DESCRIPTION OF THE INVENTION

Figure 1:
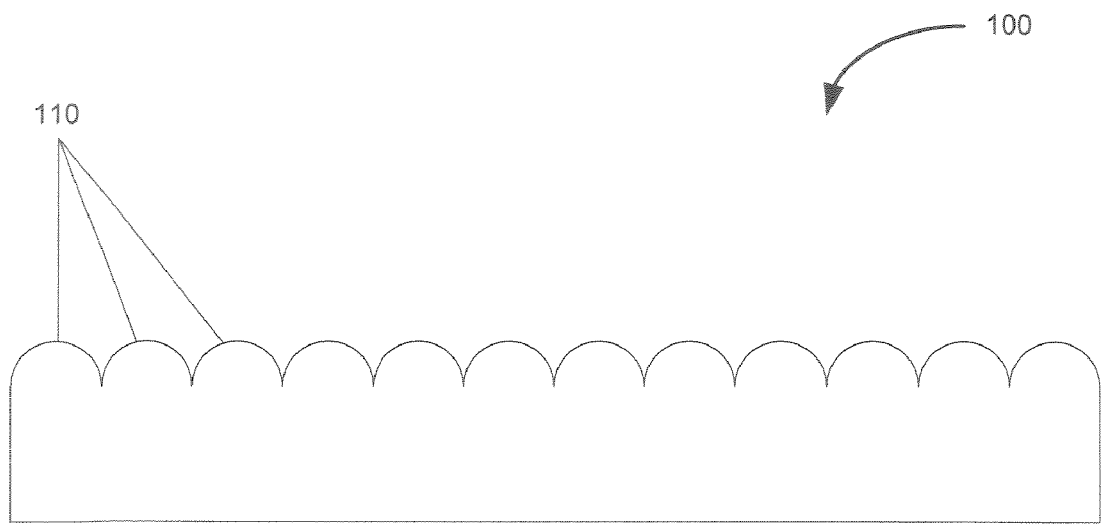
FIG. 1 shows a lenticular lens for use with an illuminated decoder in accordance with an exemplary embodiment of the invention.

The present systems and methods described herein provide illuminated lens devices for use in object authentication. In general, these devices include a lens that is specially configured for use in viewing, capturing and/or decoding authentication images applied to objects subject to counterfeiting, copying or tampering. As used herein, the term "authentication image" means an image that is specially configured or printed so as to allow verification of the authenticity of an object to which the authentication image is applied. Authentication images may include images printed with special inks (e.g., inks visible only in particular wavelengths), or images that are constructed or printed so that certain content is not readily visible to the naked eye. For example, authentication images may be printed so as to include micro-printed content that is only visible under high magnification. Authentication mages may also be graphically encoded or scrambled so that they cannot be viewed without decoding or unscrambling.

In some embodiments, the lens used in the devices of the invention may be configured to decode an encoded authentication image for direct viewing or capture. In other embodiments, the lens may be configured to magnify and project the image for direct viewing or capture by an image capturing device. In either case, the lens devices of the invention may be placed in very close proximity to or against the surface upon which an expected authentication image would be disposed. This can result in difficulty viewing or capturing the authentication image due to low light levels. Further, some authentication images are viewable only in the non-visible portion of the spectrum and thus require illumination by light sources of the proper frequency.

To address the above issues, the devices of the present invention provide an illumination source that can be mounted with a lens within a housing to cooperatively enhance the viewability of an authentication image. In particular, the illumination source/lens combination can be tailored to specific authentication image types.

Variations on the devices of the invention will now be discussed. In some embodiments, the illuminating lens device is itself a type of illuminated decoder. The illuminated decoder provides for decoding documents, commercial products and other objects using security images and/or optically decodable images that have been applied thereto. The illuminated decoder provides for viewing an authentication image. The illuminated decoder also provides for capturing an image of the authentication image applied to an object, the image enhancing the resolution of the captured image to enhance the capability to view the captured authentication image.

Exemplary embodiments of the invention are directed to providing an illuminated decoder that can be used to decode encoded images in low light situations, when ambient light alone may be insufficient to reveal the encoded image as authentication image. The illuminated decoder comprises a housing, a lens capable of decoding encoded images and a light source associated with the lens.

As used herein, the term "encoded image" refers to an image that is rasterized, scrambled, manipulated and/or hidden, such that when em bedded and/or concealed in a document or in a background field or in another image, the authentication image cannot be discerned from the base document material or background field or the other image without the use of an optical decoding device. An encoded image may be generated from an authentication image using a particular set of characteristics that include encoding parameters corresponding to certain optical characteristics of the decoding device. If the encoded image is printed, placement of the decoding device over the printed encoded image in a predetermined orientation reveals the authentication image. Without the decoding device, some or all of the encoded image may be visible, but the authentication image is indecipherable or indistinguishable from the background by the naked eye. In other cases, the presence of the encoded image may also be indecipherable or indistinguishable from the background by the naked eye. If the encoded image is captured by a decoding device, determining the encoding parameters of the encoded image and decoding the encoded image using the encoding parameters reveals an authentication image. Without knowing the encoding parameters the authentication image is indecipherable or indistinguishable from the image in which it is applied.

One method of producing encoded images is through a rasterization process such as that described in U.S. Pat. No. 5,708,717 (the '717 Patent), which is incorporated herein by reference in its entirety. Encoded images may be printed with a certain line density, called a frequency. In the '717 Patent method, digitized authentication images are encoded by rasterizing them according to a series of predetermined encoding parameters to produce an image having a particular line frequency. The line frequency corresponds to the number and spacing of regular line segments into which an image is divided (rasterized). The size and number of divisions determines the frequency (i.e., number of line segments per inch) of the encoded image.

The decoding device used to decode the encoded images of the above described methods may be a lens, such as a lenticular lens for example, having optical characteristics matching those of the encoded image. In particular, the lenticular lens may be formed with a lens frequency that corresponds to the line frequency of the encoded image. When placed over the encoded image and rotated to a correct angular orientation to align the frequency of the lens to the frequency of the image, the encoded image is decoded, thereby allowing the authentication image(s) to be viewed.

Although the rasterization methods of the '717 Patent are referred to throughout this specification, it will be understood by those of ordinary skill in the art that any image encoding method having a set of definable image characteristics relatable to a decoding device with corresponding optical characteristics may be used to produce images for use in conjunction with the illuminated decoders of the present invention. Other methods that may be used are described in U.S. application Ser. No. 11/068,350 filed Feb. 28, 2005, which is incorporated herein by reference in its entirety.

Likewise, although lenticular lenses are primarily referred to, it will be understood by those of ordinary skill in the art that other types of lenses with optical characteristics corresponding to the image characteristics of various encoded images may be used to decode the images.

Decoders and encoded images of matched-frequency are useful in various applications including the security printing and anti-counterfeiting industries. Products such as branded goods or important documents, such as driver's licenses, for example, may be printed to include encoded images having a particular frequency.

In low light situations, decoding encoded images may be made more difficult by the lack of ambient light. This may result in increased difficulty in determining whether an encoded image is present over and above normal decreased viewing ability in low light situations Additionally, in certain situations, encoded images may be printed in ink that is not visible unless an external light source is used to produce light other than normal visible, ambient light. For example, encoded images may be printed with inks that are only visible when stimulated with ultra-violet or infrared light, which are not typically present in normal ambient light conditions. By using illuminated decoders in accordance with exemplary embodiments of the invention, the additional light source needed to more clearly determine whether an encoded image is present is conveniently provided, providing a faster and more accurate determination of whether an item is genuine.

As used herein, a "lens" is any device capable of altering the character of transmitted or reflected light. As light passes through a lens it undergoes two refractions. Refraction or bending of light occurs as light passes from one medium to another when there is a difference in the index of refraction between the two materials. As the light enters the lens, it passes from air into the lens material. The lens material has a different index of refraction from air causing the light to refract a first time. Then the light travels through the lens. At the other side of the lens, the light again refracts as it goes from the lens to air.

For example, as with the lenticular lens shown in FIG. 1, the surface of the lens 100 may be curved in such a manner as to direct the light in a certain direction, causing the light to refract at a predetermined angle. The angle of refraction depends on several factors, including the index of refraction of the lens material and the thickness of the lens with respect to the radius of curvature. Typically, for an acrylic lens, the thickness is about 3 times the radius of curvature.

FIG. 1 shows an exemplary embodiment of a tentacular lens 100 with a plurality of curvatures 110 designed to refract light entering the lens at a certain, predetermined angle based on the radius of the curvatures 110. The curvatures 110 have a uniform width that results in a lens frequency of a certain number of lines (i.e. curvatures) per inch. As light entering the lens 100 refracts as a result of the curvatures, an encoded image printed with the same number of lines per inch can be viewed by a user viewing the image through the lens 100 to reveal an authentication image.

Any type of lens having optical characteristics matching the encoded image can be used with exemplary embodiments of the present invention. For example, the lens may be a lenticular lens that has a single set of regularly spaced curvatures as shown in FIG. 1 or the lens may be a multi-sectioned decoder, having multiple layers of regularly spaced curvatures as described in more detail in U.S. Patent Publication 20030228014 which is hereby incorporated by reference in its entirety. Other exemplary lenses include those that have a lens frequency in two different planes or which have a frequency that varies across a horizontal face of the lens.

The lens may be made of any transparent material, such as glass or plastic, with a preference for acrylic lenses. Acrylic lenses are typically manufactured using injection molding techniques, using a mold to produce the curvatures of the lens. Other exemplary plastics useful for manufacturing lenses for use with embodiments of the present invention include polycarbonate and polypropylene. Typically, lenses of these materials are embossed with a pattern to produce the desired lens frequency.

To achieve a lens that permits an encoded image to be viewed as an authentication image with a high level of clarity, it may be desirable to have a lens thickness within a tolerance of plus or minus $5/1000$ of an inch of the desired thickness to achieve the desired optical characteristics of the lens. Additionally, lenticular lenses typically have a lens frequency pattern accurate to greater than about 90% of the design frequency. For example, in an injection molded lenticular lens, the mold used to create lenses may deteriorate over time such that a lens made using the mold, and particularly the curvatures of the lens, may become deformed during manufacture. As long as about 90% or more the curvatures are properly formed, the lens may continue to provide a desirable level of decoding, although a level of accuracy of about 98% or greater is preferred.

Thus, a lens with a particular lens frequency can be used to decode encoded images with a matching line frequency, such as, by way of example only, by customs agents or private investigators verifying whether certain branded goods are genuine or counterfeit. For a particular branded good, the good's producer may know that it prints encoded images having a particular line frequency onto its product packaging. The producer may assign agents to attempt to decode encoded images on products bearing the brand of the producer using a lens that has a lens frequency corresponding to the line frequency of the encoded image for the product under investigation. If an encoded image is present and thus an authentication image is revealed when the good is viewed through the decoder, the goods' authenticity is verified, while if an image is not present, the goods have been identified as a likely counterfeit.

Often, these investigations may be conducted in environments where ambient light is low, for example, in dimly lit warehouses. In low light situations, it may be difficult to determine whether or not an encoded image is present by viewing through the lens without an additional source of light. By using illuminated decoders in accordance with exemplary embodiments of the invention, the additional light source needed to more clearly determine whether an encoded image is present is conveniently provided, providing a faster and more accurate determination of whether an item is genuine.

Furthermore, using a light source to illuminate the encoded image may improve the overall clarity of the authentication image revealed to a person viewing the image versus one viewing the image through a decoder using only ambient light, even ambient light is relatively intense.

In order to better view encoded images in low light situations, at leas one light source may be associated with the lens, providing a lens-based device that casts light onto an encoded image, providing sufficient light to make any encoded image printed thereon viewable. The light source may be any light source, such as one or more light bulbs or light emitting diodes (LEDs) for example.

The light source is associated with the lens to create a single unit, typically through the use of a housing or overlay that attaches to both the light source and the lens. In certain exemplary embodiments, the lens, the light source or both, may be contained within the housing. Unlike the lens, which is substantially transparent in order to view through the lens, the housing is at least translucent, and preferably opaque to keep light from entering or exiting the housing except through apertures designed to permit a viewer to see through the lens. The housing may be manufactured from various materials, but typically comprises one or more injection molded rigid, plastic pieces.

Figure 2A:
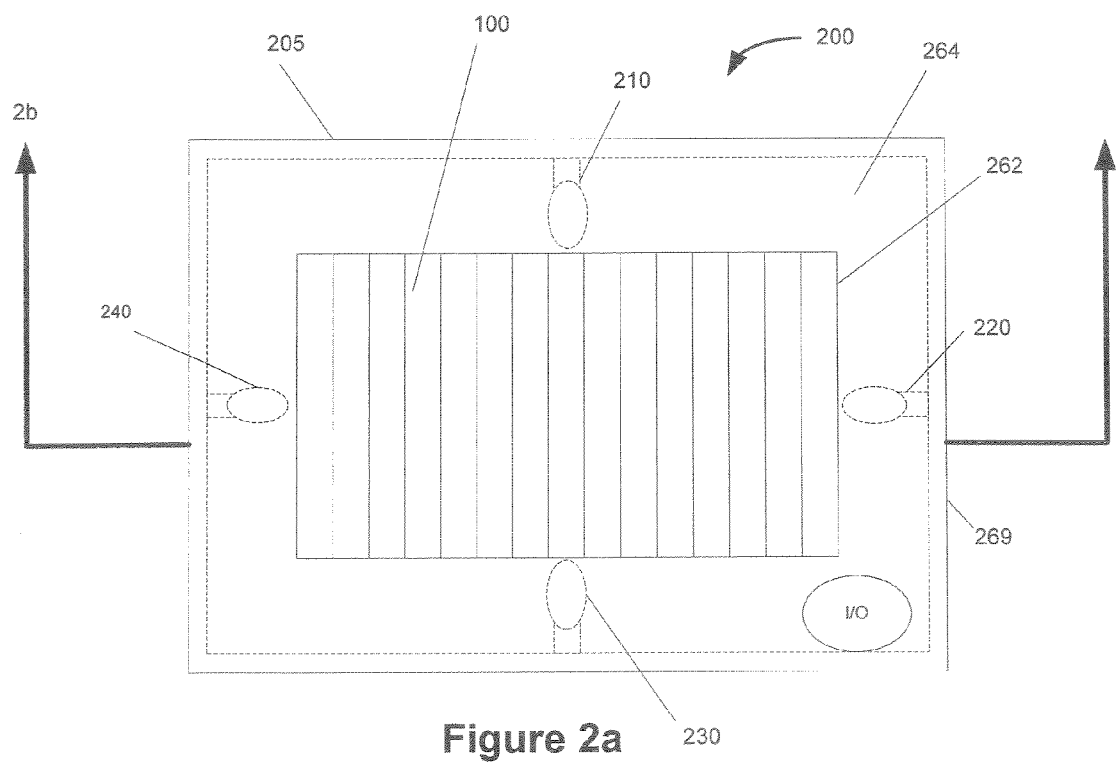
FIG. 2a is a top view of an illuminated decoder according to one exemplary embodiment of the invention.
Figure 2B:
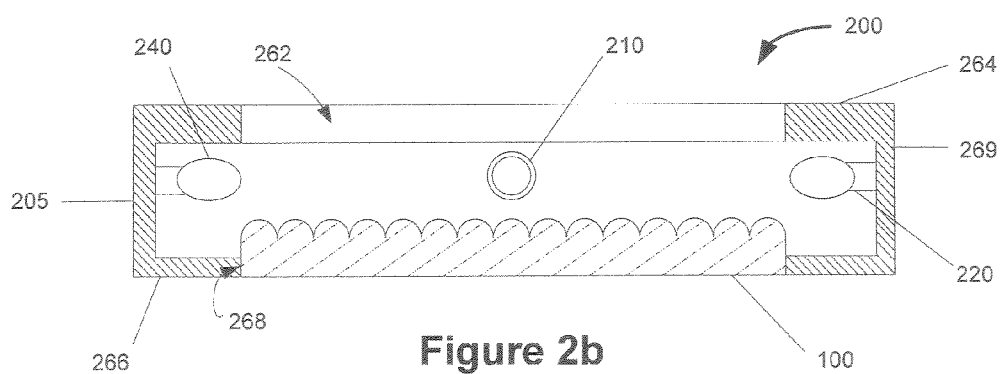

An exemplary embodiment of an illuminated decoder is shown in FIGS. 2a and 2b. The illuminated decoder 200 comprises a housing 205, and a lenticular lens 100 and light sources 210-240 attached to the housing 205. The housing 205 may also contain a battery (not shown) or other power source connected to the light sources. The light sources 210-240 are attached to the interior of side walls 269 of the housing 205 in a plane orthogonal to the lens 100, although they need not be so oriented.

FIG. 2b shows a cross-sectional view of the illuminated decoder of FIG. 2a. The housing 205 includes a top wall 26A and a bottom wall 266, along with four side walls 269. The top wall 264 contains a top aperture 262, while the bottom wall 266 contains a bottom aperture 268, the bottom aperture 268 is sized and configured to accept the lens 100. The two apertures 262, 268 are in registration with one another such that the lens 100 is viewable through the top aperture 262 and a person using the illuminated decoder 200 can see through the lens 100 to a surface below. The lens 100 may be attached to the housing 205 using an adhesive, a friction connection, or in some other manner.

The housing 205 has a top wall 264 surrounding the top aperture 262 that acts as a shield so that the light sources 210-240 are partially or fully shielded from the eyes or a person viewing through the illuminated decoder 200 positioned over an encoded image. The top wall 264 or side walls 269 may be configured to direct light toward the bottom aperture 268, such as by a reflective coating applied to an interior surface of the top wall 264 or by modifying the angle of the interior side walls as shown in FIG. 3a and 3b.

Figure 3A:
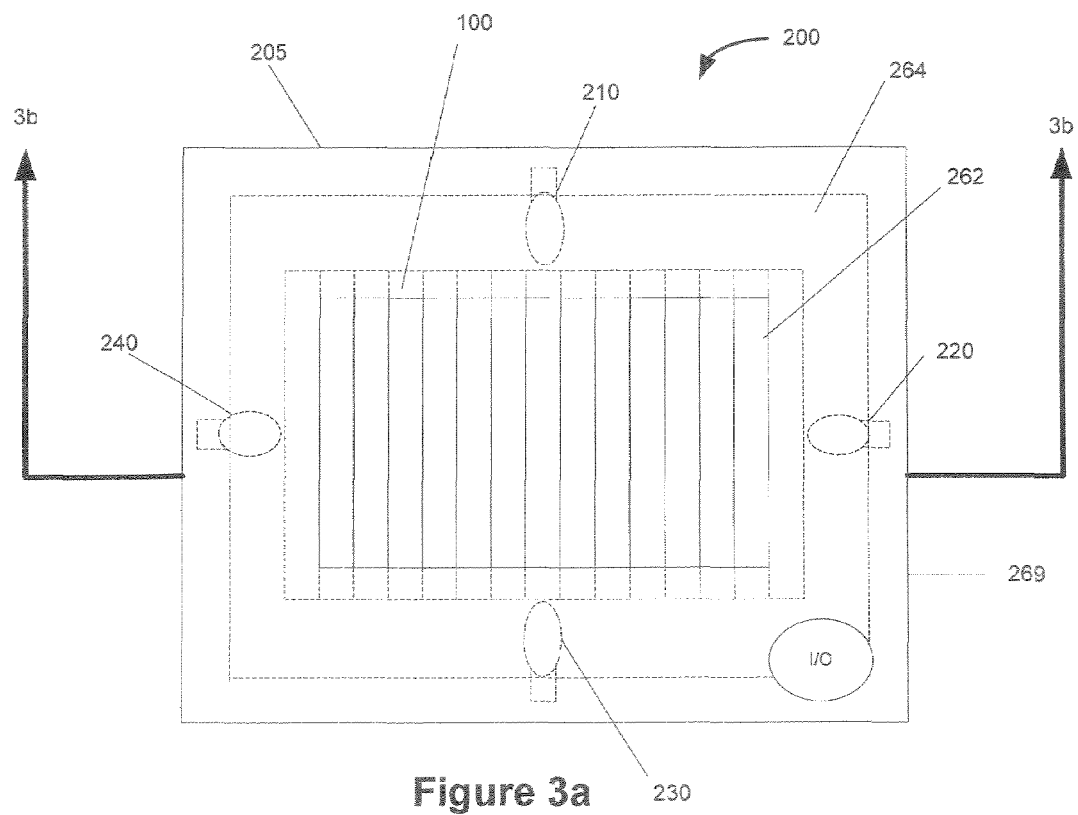
FIG. 3a is a top view of an illuminated decoder according to one exemplary embodiment of the invention.
Figure 3B:
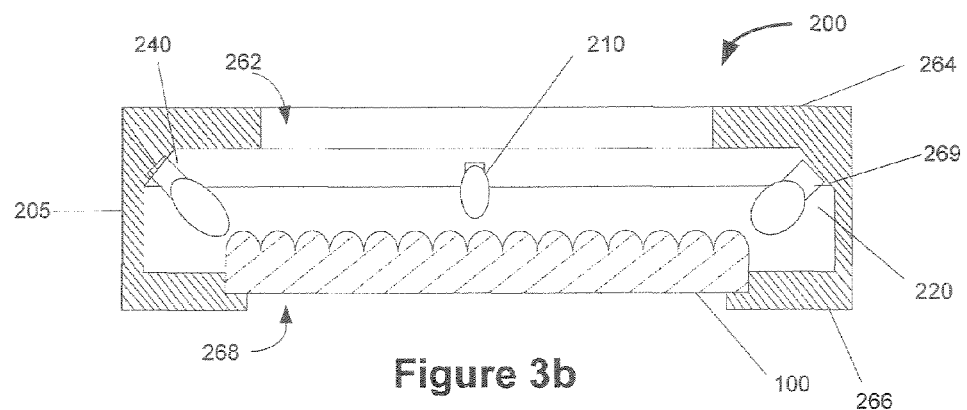

FIGS. 3a and 3b illustrate another exemplary embodiment in which the interior side walls 269 are angled to direct light from the light sources 210-240 toward the bottom aperture 268. FIG. 3b also shows that in certain embodiments, the lens 100 may be contained entirely within the housing 205, the bottom wall 266 supporting the lens 100 above the bottom aperture 268.

Figure 4A:
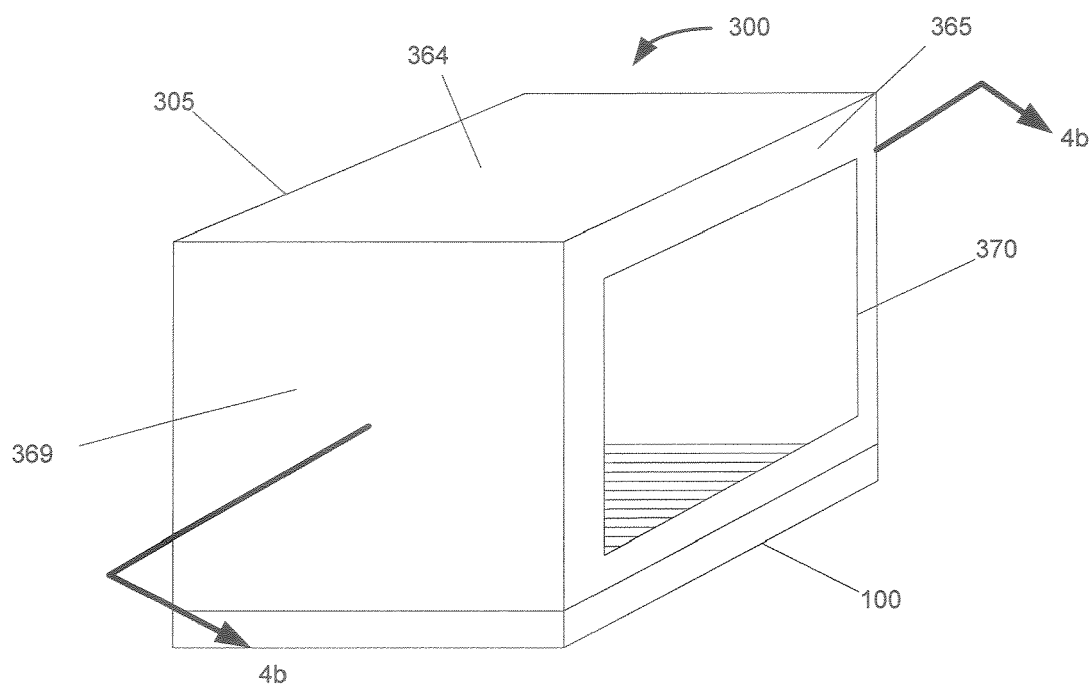
FIG. 4a is a perspective view of an illuminated decoder according to another exemplary embodiment of the invention.
Figure 4B:
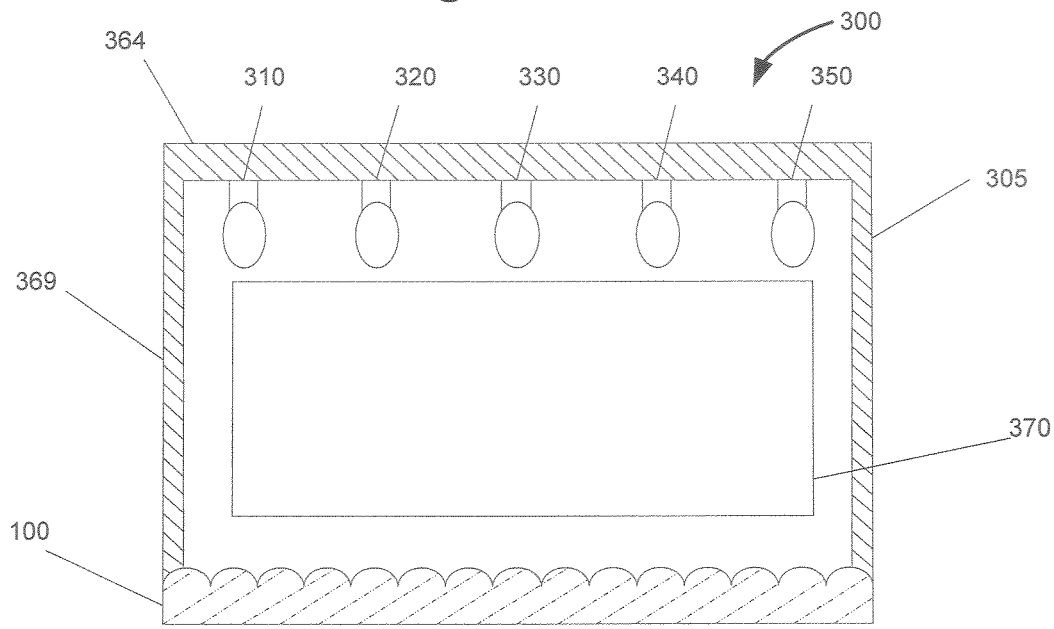

An exemplary embodiment of another illuminated decoder is shown n FIGS. 4a and 4b. FIG. 4a is a perspective view of an illuminated decoder 300 having light sources attached to a housing 305 above a lenticular lens 100. The housing 305 is mounted over the lens 100. The housing 305 has a top wall 364 and four side walls 369. It should be appreciated that in this and other embodiments, the number of side walls 369 may be greater or fewer than four depending on the desired geometry of the illuminated decoder 300.

A cross-sectional view of the illuminated decoder of FIG. 4a is shown in FIG. 4b. As shown in FIG. 4b, the housing 305 has an open bottom. In this exemplary embodiment, the housing 305 is attached to the lens 100 such that the lens 100 forms a bottom wall of the illuminated decoder 300. Multiple light sources 310-350 are attached to the top wall of the housing 305 opposite the lens 100 and configured to shine therethrough.

As shown in FIGS. 4a and 4b, when the light sources 310-350 are opposite the lens 100, it may be advantageous to have a side aperture 370 in one of the sidewalls 369 of the housing 305. Although the aperture 370 is shown in a plane orthogonal to the plane of the lens 100, the aperture 370 need not be so arranged, and may be configured at angle, as shown in FIG. 5 for example.

Figure 5:
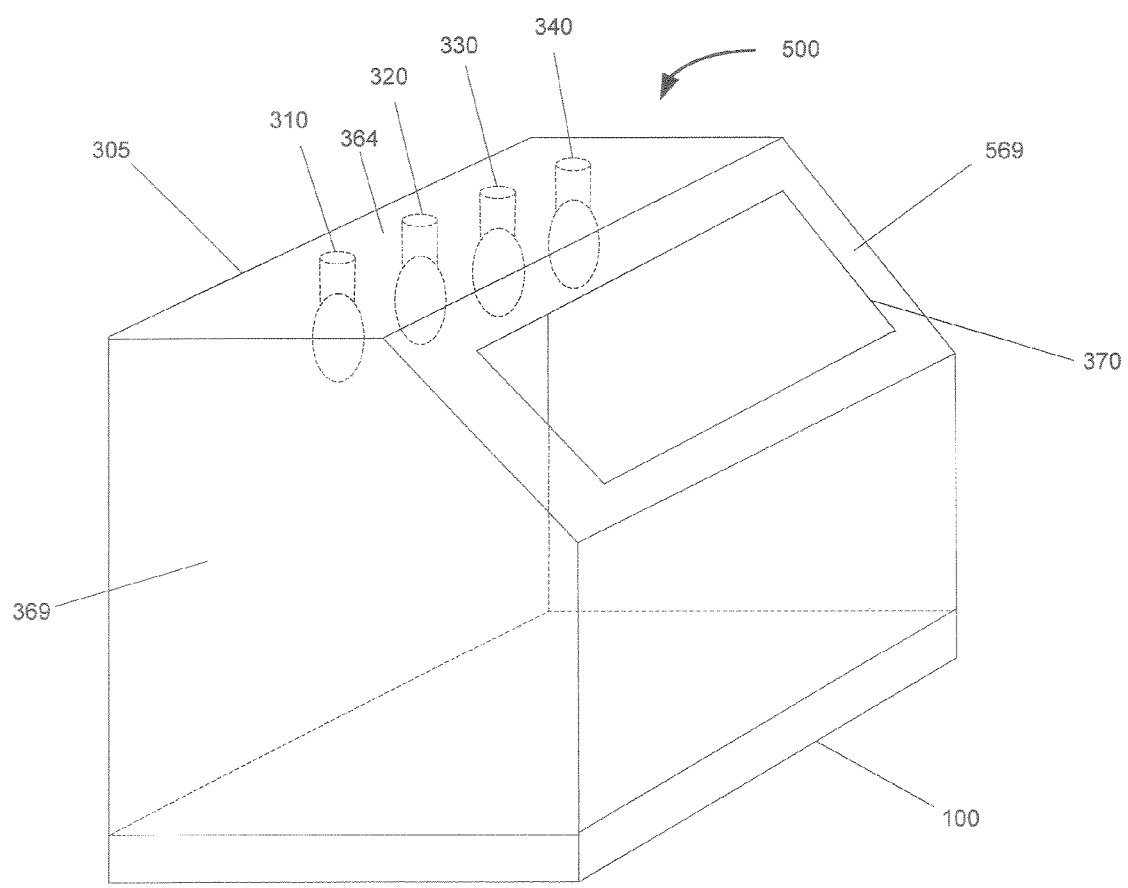
FIG. 5 is a perspective view of an illuminated decoder according to another exemplary embodiment of the invention.

FIG. 5 shows an exemplary embodiment of an illuminated decoder 500 that is in many respects similar to the illuminated decoder 300 of FIGS. 4a and 4b. However, in FIG. 5, the illuminated decoder has an angled side wall 569 containing a side aperture 370 for viewing through the illuminated decoder to a surface beneath the lens 100.

As described with respect to other exemplary embodiments of the invention, in embodiments where a side wall includes a side aperture, the side aperture may be positioned such that the side wall shields a viewer's eyes from directly viewing the light source when the viewer looks through the illuminated decoder at a surface containing an encoded image. Accordingly, the side aperture is preferably placed at a distance from the top wall that conceals the light sources from direct view.

Often, a lens used to decode encoded images may first need to be rotated to a correct orientation to reveal the authentication image. In some cases, it may not be possible for a user inspecting a good or document to rotate the decoder and still easily see through the illuminated decoder, for example, when using an exemplary embodiment of an illuminated decoder having a single side aperture. As the illuminated decoder is rotated, a user would either have to move along with the decoder to continue viewing through the side aperture, or rotate the item being viewed so that the illuminated decoder, and thus the side aperture, is held in place.

Figure 6A:
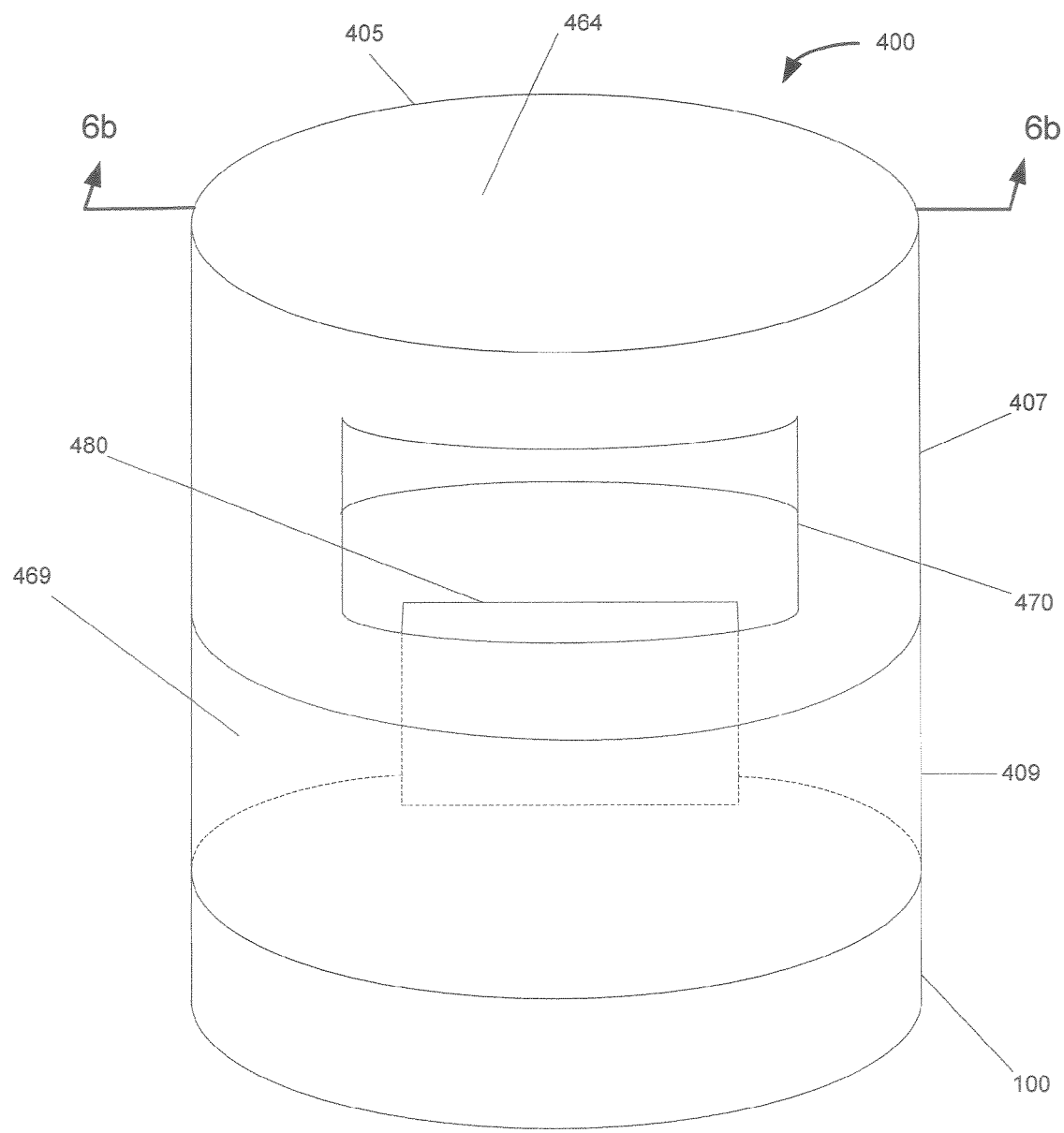
FIG. 6a is a perspective view of an illuminated decoder according yet another exemplary embodiment of the invention.
Figure 6B:
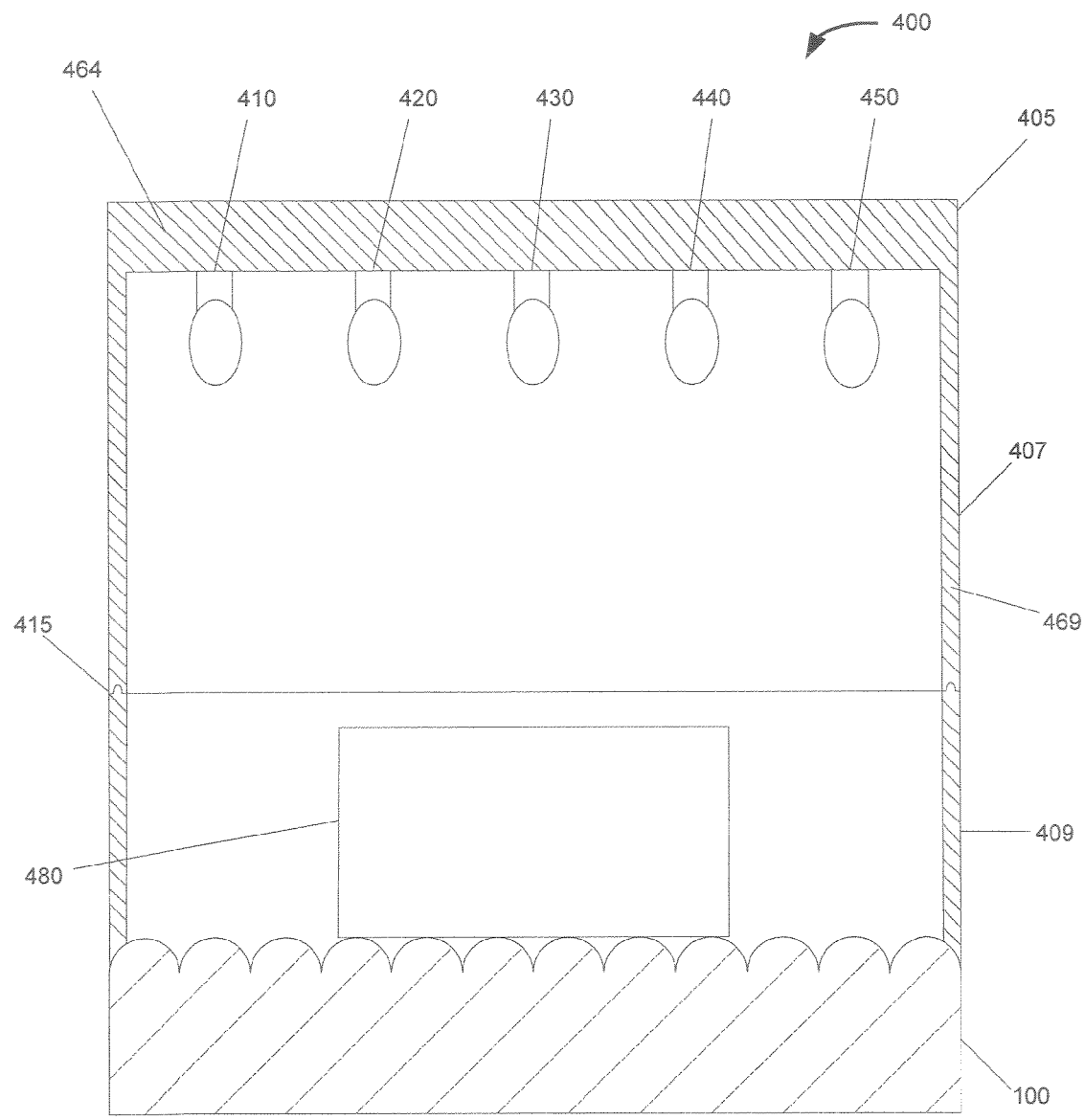

In certain situations, such as inspecting goods in a warehouse, either or both the user and the item under inspection may have limited mobility. To alleviate this problem, two or more top or side apertures may be used, such that the illuminated decoder can be viewed through from more than one direction. Alternatively, yet another embodiment of illuminated decoder, as shown in FIGS. 6a and 6b, may conveniently be used. In this embodiment, the illuminated decoder further comprises one or mirrors to reflect the image seen when viewing through the decoder and the decoder can be rotated to direct the reflected image toward a viewer's eyes.

FIG. 6a shows an illuminated decoder 400 that has a housing 405 that includes a top wall 464 and a side wall 469. The housing 405 comprises a top section 407 and a base section 409. A lens 100 is attached to the base section 409 to form a bottom wall of the illuminated decoder 400. A side aperture 470 is located in the side wall 469 of the top section 407 of the housing 405. As shown in more detail in FIG. 4b, the base section 409 and top section 407 are rotatably attached to one another, such as, for example, by a male/female connection 415. In this manner, the base section 409 and the lens 100 attached thereto can be manually rotated while the top section 407 is held in place.

A mirror 480 attached to the base section 409 is positioned to reflect light, and hence any authentication image, back through the viewing aperture 470 as the base section 409 and lens 100 are rotated over an encoded image. Depending on the dimensions of the housing 405, and the angle of the mirror 480, it may be necessary to use two or more mirrors to reflect light from the light sources 410-450 back through the side aperture 470 such that an authentication image can easily be viewed.

It should be appreciated that in certain embodiments, the illuminated decoder may be configured so that only the lens 100 rotates, while the entire housing 405 is held in place.

The light source used in various embodiments of the invention may produce any kind of light, including visible, infrared, or ultraviolet light.

It should be appreciated that the light from the light source used in the illuminated decoder must match the type of ink used to print the encoded image for an authentication image to be revealed. For example, various types of ink may be used to print encoded images, including those which can viewed in the visible light range only when first stimulated by non-visible light, such as infrared or ultraviolet light. If the ink used to print encoded images is the type of ink that can only be seen when exposed to infrared light, then the light source must contain light with an infrared component to make the encoded image appear in the visible light range while the decoder reveals the authentication image. Likewise, if the encoded image is printed with cyan ink, then the light must have a visible light component.

In embodiments where light from the light source is other than visible light, it may be particularly desirable to contain as much of that light within the housing as possible. Thus, it may also be desirable to exclude excess ambient light from entering the housing, while still including housing apertures for a person to view through the lens. Ambient visible light may have the effect of diluting the non-visible light from the light source, decreasing the visibility of the encoded image and hence, the revealed authentication image. This may be overcome, for example, by making the housing completely opaque and/or reducing the size of the housing apertures.

Thus, embodiments of the present invention may be particularly advantageous when used to decode encoded images printed with infrared or ultraviolet inks, regardless of the intensity of ambient visible light (See U.S. Pat. No. 6,985, 607, which is incorporated herein by reference in its entirety.) When these types of inks are used to create the encoded image, the image may not be viewable in visible light at all, regardless of the amount of ambient light, because the ink is not visible unless first stimulated by light outside of the visible range, usually by a particular wavelength of light. By using an illuminated decoder with a light source that produces a particular wavelength of non-visible light that corresponds to the ink used to print the encoded image, the encoded image both appears in the visible light range and is decoded to reveal an authentication image at the same time through the use of the illuminated decoder.

If light outside the visible range is used, the material used for the lens of the illuminated decoder should be selected such that it has a high transmittance of the non-visible light source. For example, some materials have a low transmittance of ultra-violet light. Thus, if the illuminated decoder is used to reveal images printed with ink that appears in the visible range when exposed to ultra-violet light, a lens material should be used that transmits a high percentage of that type of light through the lens. One type of resin useful for making a lens with both a high ultra-violet and infrared transmission is the polymethylmethacrylate available as ACRYLITE H15-012 from Cryo Industries, Woodcliff Lake, N.J., USA. Those of ordinary skill in the art will appreciate that other resins with high transmittance outside the visible light range are available and could also be used to produce a lens for use in exemplar embodiments of illuminated decoders of the present invention.

Light filters may be added to the illuminated decoder to enhance the visibility of encoded images and make the authentication images more readily viewable when revealed. Examples of filters include additive or subtractive dichoric filters that enhance various colors used to print the encoded image. Likewise, a polarized filter may be used to enhance contrast, making the features of the encoded image more readily visible. The filters may be applied to the lens, to the light source, or across an aperture of the illuminated decoder such that the filters are somewhere within the path of the light as it travels from the light source to the viewer's eye.

Figure 7:
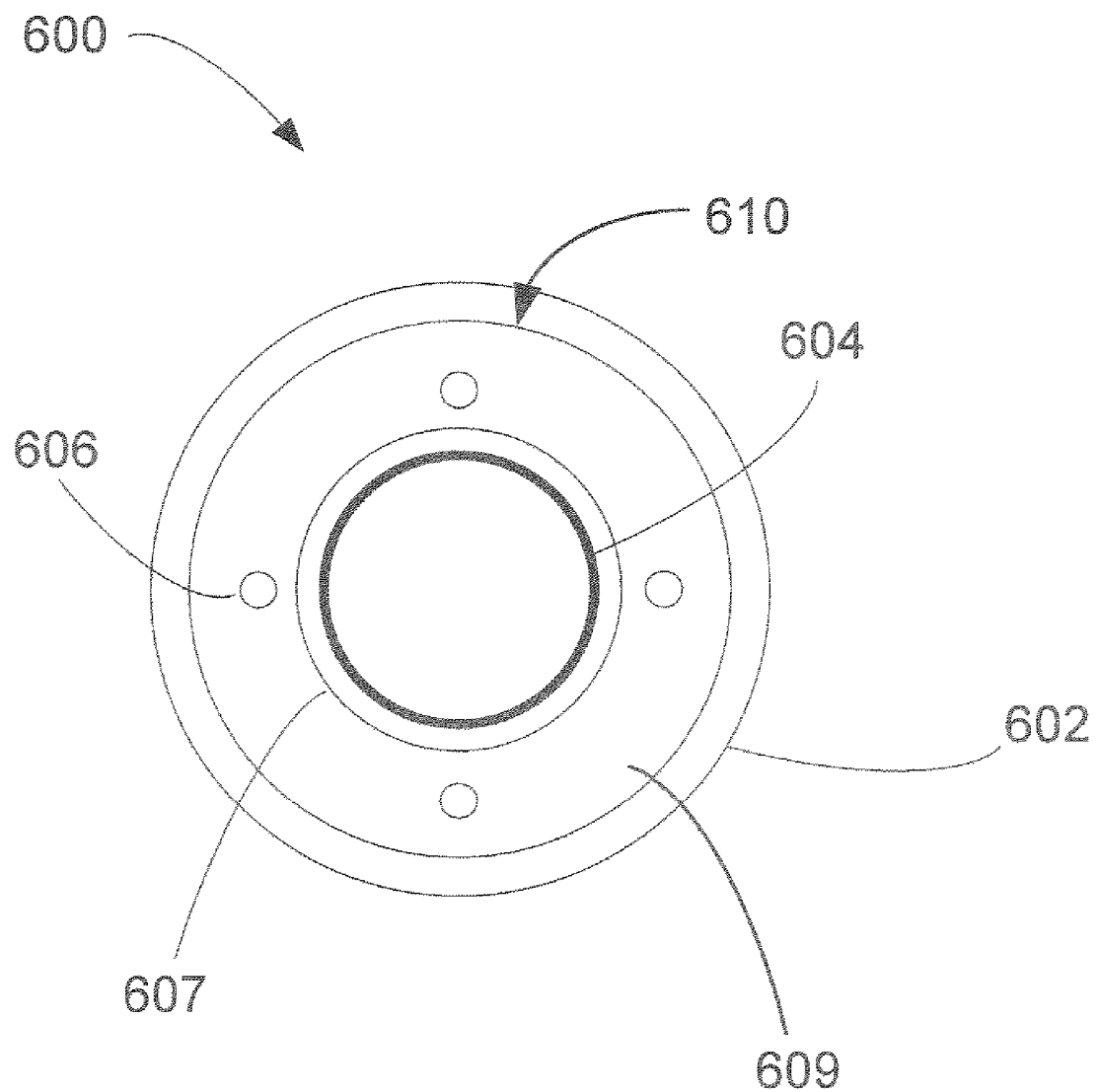
FIG. 7 is an illustration of an illuminating lens device according to an embodiment of the invention.
Figure 8:
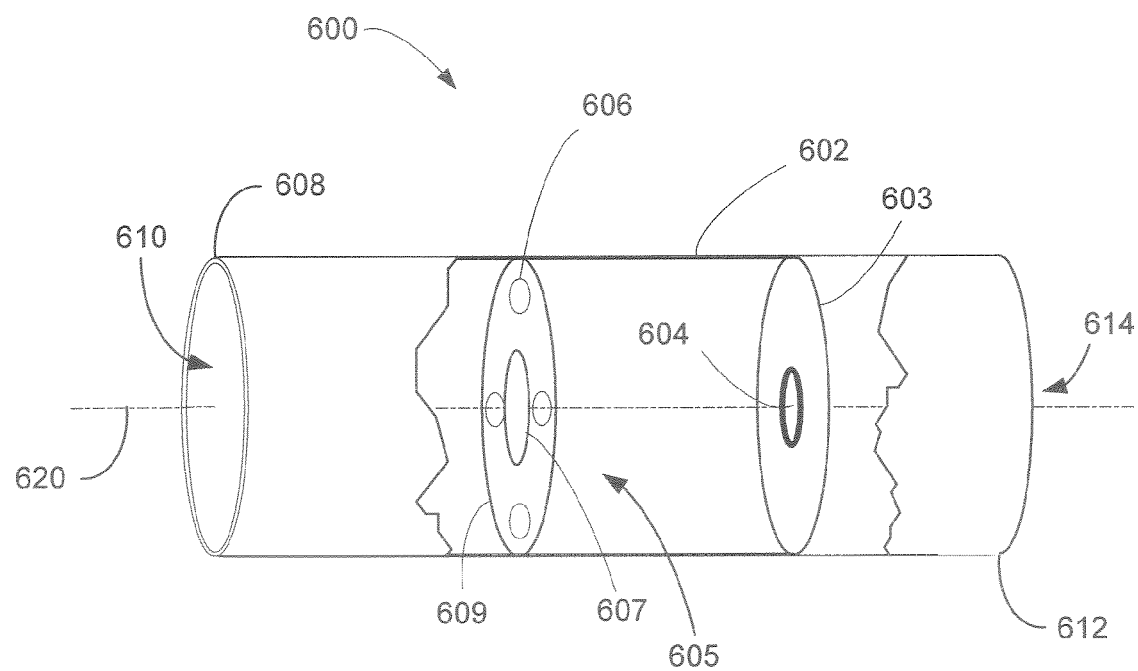
FIG. 8 is a cross-sectional view of an illuminating lens device according to an embodiment of the invention.

Some embodiments of the present invention provide illuminated lens devices that are not themselves decoders, but are still configured to facilitate the viewing and capture of encoded and non-encoded authentication images. FIGS. 7 and 8 illustrate an illuminating lens device 600 for use in object authentication according to an embodiment of the invention. FIG. 7 provides a front view of the illuminated lens device 600 and FIG. 8 provides a cross-sectional view. The illuminating lens device 600 is particularly adapted for viewing and especially capturing a magnified digital image of a security image applied to an object, the magnified image enhancing the resolution of the captured image to enhance the capability to view micro-printing and/or to decode a captured encoded image using software-based techniques.

The illuminating lens device 600 includes a tubular housing 602, a lens 604 disposed at least partially within the housing 602, and an illuminator assembly 605 having one or more light sources 606 configured to illuminate the authentication image with light in a predetermined frequency range. The tubular housing 602 has at least one wall defining a housing interior. The housing 602 also has a proximal end 608 with a proximal aperture 610 and an opposing distal end 612 with a distal aperture 614. The housing 602 is generally hollow, circular, and/or tube shaped. However, the housing 602 may have any shape or structure. The housing 602 may be configured for engagement by an image capture device. In particular, the proximal aperture 610 may be engaged by and, in some embodiments attached to, an image capture device such as any form of portable or non-portable digital image capturing device, including various types of digital and non-digital cameras, scanners, cell-phones or other telecommunication devices, PDAs, etc. The image capture device may be used for viewing the authentication image and/or capturing an image of an authentication image. The captured image may be a digital image.

The lens 604 is disposed within the housing interior and has an optical axis aligned with the centerline 620 of the tubular housing 602. The lens 604 is supported by a lens support structure 603 and is positioned so that some or all of an authentication image is viewable through the proximal aperture 610 when the housing 602 is placed with the distal aperture 614 aligned with and adjacent the authentication image. It will be understood by those of ordinary skill in the art that the relative size of the authentication image may be such that only a portion of the authentication image is viewable at any one time. The illuminating lens device 600 may have more than one lens 604. Further, the lens 604 may be supported by a lens support holder placed within the housing 602. The lens 604 may be any suitable lens or lens combination and may, in particular, be configured to magnify the viewed authentication image. Further, the lens 604 is mounted within the housing 602 proximal to the at least one light source 606. The magnifying lens has a focal point external to the housing 602 proximal to the proximal aperture 610. For example, the magnifying lens may magnify the authentication image for viewing and/or capturing. The magnifying lens may allow an image to be viewed and/or captured from 6 to 10 microns. In some embodiments, the lens 604 may be a 10-60× lens. Generally, the spacing from the lens 604 to the distal end 612 will increase or decrease the magnification and/or distance of the authentication image.

The lens device 600 and particularly the lens 604 may be adapted for use with specific image acquisition devices. The lens 604 may be interchangeable and may interact with a zoom lens or regular lens of the image acquisition device. The lens 604 may interact with the flash of an image acquisition device. Further, the lens 604 may interact with the image acquisition device to increase or decrease the magnification of the authentication image. The magnification of the lens may be manual or automatic. Additionally, the lens 604 may be a physical lens or an electronic/digital lens.

The illuminator assembly 605 is disposed within the housing interior ahead of (distal to) the lens 604 and includes a support structure 609 configured to support an array of light sources 606. The support structure 609 includes a central aperture 611 through which light may pass to the lens 604. The light sources 606 are configured to illuminate the authentication image with light in a predetermined frequency range when the housing 602 is placed with the distal aperture 614 adjacent the authentication image. The light emitted from the light sources 606 at the predetermined frequency range may reveal ink, information, or data that would otherwise have been indecipherable or invisible. The predetermined frequency range is selected based on the viewability of the authentication image when illuminated by light in the predetermined frequency range. The predetermined frequency range includes ultraviolet light frequency and an infrared light frequency. The predetermined frequency range may be about 150 nm to about 800 nm. The predetermined frequency range may also be about 300 nm to about 450 nm. The predetermined frequency range may further be about 370 nm to about 375 nm. The light sources 606 may emit a concentrated portion of light on a particular area of the authentication image. The light sources 606 may be or include an incandescent bulb, a fluorescent bulb, a light-emitting diode, or a halogen bulb. The light sources 606 to provide substantially uniform illumination of any surface placed against the distal aperture 614. It will be understood that any number of light sources 606 may be used.

The light source 606 may include a device to diffuse light or may include a function to diffuse light. The light diffuser device may be any shape. However, for even distribution of light over the authentication image, the light diffuser should be shaped as a "ribbed" cone.

The illuminating lens device 600 may also include a light filter. The light filter broadens and/or narrows the wavelength revealed by the light source 606. The light filter may include a colored filter, a split field filter, a polarized filter or any other filter used in digital photography. The filter can function to assist in viewing authentication images. The light filter may be a long pass filter or a short pass filter. A long pass filter functions to transmit a wide spectral band of long wavelength radiation thereby blocking short wavelength radiation. A short pass filter functions to transmit a wide spectral band of short wavelength radiation thereby blocking long wavelength radiation.

In any of the illuminated lens devices of the invention, the type of light source can be varied. In many cases, the light source may be an LED, incandescent bulb, fluorescent bulb, or halogen bulb. LEDs are preferred because they are typically of small size, but still produce a substantial amount of light versus the amount of power they consume. Power can be delivered to the light source by any electrical power source, although battery power is preferred to make the illuminated lens device mobile and independent of its proximity to a stationary power supply, such as an electrical outlet. The power source may be contained within a compartment of the housing of the illuminated lens device to hide it from view. The power supplied to the light source can be switched on or off using a conventional switching device.

The illuminating lens devices of the invention may be configured for attachment to an image acquisition device. As used herein, the terms "image capture device" and "image acquisition device" mean any device or system used to capture or produce an image of a document or object or target portions thereof. An image acquisition device may be adapted to magnify and record an image. The device will have a built in magnification feature that provides this feature. Image acquisition devices may be any portable or non-portable device. Image acquisition devices include but are not limited to scanners, digital cameras, portable phones, personal digital assistants (PDAs) and systems having a combination of an analog camera and a frame grabber. The image acquisition device may be adapted for capturing images using light in the visible or non-visible (e.g., UV and IR) portions of the electromagnetic spectrum. The image acquisition device may scan or capture printed encoded images.

In particular, the illuminating lens devices of the invention may be used in conjunction with a standard or specialized digital camera to illuminate, magnify and view and or capture an image printed on a label of an object to be authenticated.

In general, a high resolution of an image may improve the ability to decode an encoded image. It has been found that illuminating lens devices and/or image acquisition devices having a high magnification capability are particularly well adapted for use in viewing and/or capturing higher resolution images of security printing and encoded images for review and, if appropriate, decoding. Such magnification may be achieved using a specialized image acquisition device with a magnification capability built in, a illuminating lens device, or through the use of a standard image acquisition device to which a magnification device has been added or attached. For example, a lens with magnification capability, as discussed above, may be attached or built-into a specialized image acquisition device, a illuminating lens device, and/or a standard image acquisition device to improve the magnification. In particular, a illuminating lens device may be an attachment for standard digital cameras that can improve the magnification capability. The devices can also be used to significantly increase the resolution of viewed and/or images.

When viewing and/or capturing an image one must consider how to (a) determine the actual pixel-per-inch resolution of the captured image; and (b) compensate for the different types of geometrical distortion that can be induced by the illuminating lens device. Assuming the illuminating lens device maintains the same distance from the object and the zoom function is not used. For example, the illuminating lens device is positioned directly on the surface of the object thereby providing a consistent capturing distance. However, if the zoom function is used or the illuminating lens device fails to maintain a consistent distance pre-calculated values are difficult to use. The positions and distances of the reference points on the object and the scale factors of the image will need to be recalculated.

Numerous methods nay be used to determine the actual pixel-per-inch resolution of the captured image. Two of the methods are using calibration to determine the real pixel-to-pixel resolution of the image and resealing a decoding frequency.

Generally, images captured by a scanner have an actual DPI resolution written into the header of the scanned file. Thus, the DPI is consistent and the DPI value from the file reflects the pixel-per-inch size of the image.

When an image is viewed and/or captured using a digit camera typically a fixed value of 180 DPI (or in some rare cases 72 DPI) is written in the image file header. Thus, the DPI value from the file cannot be relied upon to reflect the real pixel-per-inch size of the viewed and or capture object. Since, the DPI value is unreliable the distance between the halftone pattern elements cannot be calculated when using a digital camera. The digital camera can be calibrated to determine the real pixels-per-inch resolution of the viewed and or captured image. The scale factor of the digital camera can be calculated. In particular, the fixed DPI of the viewed and/or captured images can be internally replaced with a real DPI calculated for the illuminating lens device and digital camera. The scale factor calculation occurs by taking a picture of a reference pattern, whose physical dimensions are known. For example, if there are 1800 pixels covering one inch of the reference pattern then the resolution is 1800 pixels-per-inch. Next, the scale factor can be determined by dividing the reference pattern resolution by the actual resolution written into the image header file. In this example, the scale factor would be calculated as 1800/180=10. Upon calculating the scale factor, the actual resolution written in the image header file may be set up to reflect the resolution of the reference pattern. For example, 1800 DPI may be the new resolution of the image file header thereby replacing the fixed resolution value of 180 DPI.

Another method is to rescale the frequency with which an encoded image is to be decoded. The decoding frequency is calculated using the frequency line per inch of a security or encoded image and the scale factor of the illuminating lens device and digital camera calculated above. The frequency line per inch of a security or encoded image is divided by the scale factor to provide the decoding frequency. For example, to determine the decoding frequency using an encoded image generated with a 200 lines per inch frequency, the 200 lines per inch frequency of the image would be divided by the scale factor of 10. The calculation would result in a decoding frequency of 200/10=20 lines per inch. Rescaling the decoding frequency generally makes it easier to mingle images from the scanner and from the camera in the same application.

Geometrical distortion must also be considered when viewing and/or capturing an encoded image. Misalignment and/or rotation can distort an object, however, both can be compensated by decoding software. The decoding software can calculate the angle of rotation in the viewed or captured image. Of the many methods used to calculated the rotation angle one requires using the positions of some easily located reference points on the object or looking for a maximum of a Radon transform for an image with dominant line structures. Once the rotation angle is calculated, the captured image should not be rotated back to its referent position, to avoid distortion caused by the rotation process (e.g. interpolation on the digital grid blurs the image). The encoded image decoding parameters use the adjusted rotation angle. For example, if an encoded image is embedded with 15 degrees screen angle, and it was calculated that the object in the captured image was rotated by 3 degrees the adjusted angle of 15+3=18 degrees should be used for the decoding algorithm.

In certain image acquisition devices such as cell phones and PDA's, distortion may be caused by camera optics, better known as barrel distortion. Barrel distortion occurs when you take a picture of the square that covers most of the field of view and the sides of the square are not straight. Barrel distortion can be corrected by directly applying an inverse geometrical transform to the captured image or implementing the inverse transform in the decoding algorithm, to minimize the effects of the additional image processing operations (e.g. blurring the image by interpolation on the digital grid, adding to the processing time, etc.).

Further, in cameras, a problem may occur if the focal plane of a camera is not aligned with the object plane. The physically equidistant points on the object may have different pixel distances thereby causing linear distortion. Linear distortion may be compensated for using strategically positioned reference points on the object surface to calculate parameters for the inverse transformation.

As described in U.S. application Ser. No. 11/207,437 filed Aug. 19, 2005 ("'437 Application") and U.S. application Ser. No. 11/068,350 filed Feb. 28, 2005 ("'350 Application"), both of which are incorporated herein by reference in their entirety, a digital image of an optically encoded image may be captured by a scanner, camera or other image-capturing device, downloaded or transmitted to an authentication processor, and decoded using any of various software-based decoding techniques. Indicia and/or information may be determined from the decoded image and then used to authenticate the object or document to which the encoded image was applied. Depending on the system, the captured encoded image may be downloaded and decoded on-site or transmitted over a network (e.g., by e-mail or other network transfer process) to a central processor where the image is decoded and an authentication result generated. In some embodiments, the decoded image need never be viewed by a human being. In some systems, the encoded image may be captured by an on-site inspector who transmits the captured image to a separate processor (or series of processors) where the image is decoded and, optionally, compared to an expected authentication image. The results may then be returned to the on-site inspector or other authorized personnel.

As described in the '350 Application, software-based decoders can be used to decode encoded images t hat have been digitally created or captured. These decoders may be adapted to decode any digital version of an optically encoded i age including digital encoded images that have never been printed and printed encoded images that have been scanned or transformed by other means into digital form. The digital encoded images may be latent images embedded into background or primary images or may be visible images that have been systematically scrambled or manipulated. The primary image may be a blank image with no discernible content (e.g., a gray box) or may be an actual image with discernible content.

Software for digitally decoding digital encoded images may be incorporated into virtually any data processor. For the purpose of practicing the authentication methods of the present invention, the software may use any decoding methodology including, but not limited to, the methods described in the '350 Application. This includes (1) methods that require information on the content of the primary image, the secondary image or both the primary and secondary images; and (2) methods that do not require any foreknowledge regarding image content. Both of these method types require knowledge of the encoding parameters used to encode and embed the secondary image.

A captured encoded image (i.e., a printed encoded image that has been scanned or otherwise digitally captured using an image acquisition device) may be processed by a decoding processor adapted to apply one or more software-based decoding algorithms to produce a decoding result. Using such methods as optical character recognition (OCR), the decoding processor may also be adapted to extract indicia and/or information from the decoded image and to compare the extracted indicia and or information to predetermined authentication criteria. As will be discussed, the decoding processor may be at a location remote from the image acquisition device.

As discussed above, the functions of the authentication systems and the actions of the authentication methods of the invention may be carried out using a single data processor or may be distributed among multiple interconnected processors. In some embodiments, for example, the decoding and authentication functions may be carried out by different processors. Aspects of decoding functions themselves may be carried out using a single processor or a plurality of networked processors.

It will be understood that the authentication methods and systems of the invention may be used to review and/or decode magnified captured images of any form of encoded image and that the magnified captured images may be decoded using any software-based method.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An illuminating lens device for viewing an authentication image, the lens device comprising:
   a housing having at least one wall defining a housing interior, the housing having a proximal end with a proximal aperture and an opposing distal end with a distal aperture;
   a lens disposed at least partially within the housing interior, the lens being configured and positioned so that at least a portion of an authentication image is viewable through the proximal aperture when the housing is placed with the distal aperture aligned with and adjacent the at least a portion of the authentication image; and
   at least one light source disposed within the housing interior, the at least one light source being configured to illuminate the authentication image with light in a predetermined frequency range when the housing is placed with the distal aperture adjacent the authentication image.

2. An illuminating lens device according to claim 1 wherein the lens is a lenticular lens disposed within the distal aperture, the lenticular lens having a lens frequency corresponding to an expected encoding frequency associated with the authentication image.

3. An illuminating lens device according to claim 1 wherein the lens is a magnifying lens mounted within the housing proximal to the at least one light source, the magnifying lens having a focal point external to the housing proximal to the proximal aperture.

4. An illuminating lens device according to claim 1 wherein the housing is configured for engagement by an image capture device whereby the image capture device can capture an image of the authentication image.

5. An illuminating lens device according to claim 4 wherein the image capture device is configured for capturing a digital image of the authentication image.

6. An illuminating lens device according to claim 1, wherein the predetermined frequency range is selected based on the viewability of the authentication image when illuminated by light in the predetermined frequency range.

7. An illuminating lens device according to claim 1 wherein the predetermined frequency range is one of the set consisting of an ultraviolet light frequency and an infrared light frequency.

8. An illuminating lens device according to claim 1 wherein the predetermined frequency range is about 300 nm to about 450 nm.

9. An illuminating lens device according to claim 1 wherein the predetermined frequency range is about 370 nm to about 375 nm.

10. An illuminating lens device according to claim 1 wherein the at least one light source comprises one or more of the set consisting of an incandescent bulb, a fluorescent bulb, a light-emitting diode and a halogen bulb.

11. An illuminating lens device according to claim 1 further comprising:

a power source in electrical communication with the at least one light source.

* * * * *